(12) United States Patent
Kanemaru et al.

(10) Patent No.: US 8,830,244 B2
(45) Date of Patent: Sep. 9, 2014

(54) INFORMATION PROCESSING DEVICE CAPABLE OF DISPLAYING A CHARACTER REPRESENTING A USER, AND INFORMATION PROCESSING METHOD THEREOF

(75) Inventors: Yoshikatsu Kanemaru, Tokyo (JP); Akira Suzuki, Tokyo (JP); Masao Shimizu, Tokyo (JP); Takahiro Koguchi, Tokyo (JP); Fumikazu Kumagae, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 157 days.

(21) Appl. No.: 13/366,914

(22) Filed: Feb. 6, 2012

(65) Prior Publication Data

US 2012/0223952 A1   Sep. 6, 2012

(30) Foreign Application Priority Data

Mar. 1, 2011 (JP) .................................. 2011-044488

(51) Int. Cl.
*G06T 13/00* (2011.01)
*G06T 13/40* (2011.01)
*G06K 9/00* (2006.01)
*G10L 21/10* (2013.01)

(52) U.S. Cl.
CPC ............. *G06T 13/40* (2013.01); *G06T 13/00* (2013.01); *G10L 21/10* (2013.01); *G06K 9/00335* (2013.01)
USPC .......................................................... 345/473

(58) Field of Classification Search
CPC ........... G06K 9/00302; G06K 9/00221; A63F 2300/572; G06T 13/205; G06T 13/40; G10L 19/02; G10L 21/06

USPC .......................................................... 345/473
See application file for complete search history.

(56) References Cited

U.S. PATENT DOCUMENTS

| | | | | |
|---|---|---|---|---|
| 5,995,119 A | * | 11/1999 | Cosatto et al. | 345/473 |
| 6,043,818 A | * | 3/2000 | Nakano et al. | 715/851 |
| 6,181,343 B1 | * | 1/2001 | Lyons | 715/850 |
| 6,250,928 B1 | * | 6/2001 | Poggio et al. | 434/185 |
| 6,332,123 B1 | * | 12/2001 | Kaneko et al. | 704/276 |
| 6,690,376 B1 | * | 2/2004 | Saito et al. | 345/473 |
| 7,492,915 B2 | * | 2/2009 | Jahnke | 381/119 |

(Continued)

OTHER PUBLICATIONS

Wikipedia.org, WWF Superstars (handheld video game), pp. 1-2.*

*Primary Examiner* — David Zarka
*Assistant Examiner* — Brian Kravitz
(74) *Attorney, Agent, or Firm* — Matthew B. Dernier, Esq.; Gibson & Dernier LLP

(57) ABSTRACT

The basic image specifying unit specifies the basic image of a character representing a user of the information processing device. The facial expression parameter generating unit converts the degree of the facial expression of the user to a numerical value. The model control unit determines an output model of the character for respective points of time. The moving image parameter generating unit generates a moving image parameter for generating animated moving image frames of the character for respective points of time. The command specifying unit specifies a command corresponding to the pattern of the facial expression of the user. The playback unit outputs an image based on the moving image parameter and the voice data received from the information processing device of the other user. The command executing unit executes a command based on the identification information of the command.

12 Claims, 7 Drawing Sheets

(56) References Cited

U.S. PATENT DOCUMENTS

| | | | |
|---|---|---|---|
| 8,015,245 B2* | 9/2011 | Milic-Frayling et al. | 709/204 |
| 8,462,198 B2* | 6/2013 | Lin et al. | 348/43 |
| 2002/0101422 A1* | 8/2002 | Rosenfeld | 345/473 |
| 2003/0117485 A1* | 6/2003 | Mochizuki et al. | 348/14.01 |
| 2005/0026685 A1* | 2/2005 | Ruark et al. | 463/31 |
| 2005/0266925 A1* | 12/2005 | Hornell et al. | 463/42 |
| 2007/0003914 A1* | 1/2007 | Yang | 434/236 |
| 2007/0153005 A1* | 7/2007 | Asai | 345/473 |
| 2008/0215975 A1* | 9/2008 | Harrison et al. | 715/706 |
| 2008/0259085 A1* | 10/2008 | Chen et al. | 345/473 |
| 2009/0042654 A1* | 2/2009 | Barber | 463/42 |
| 2009/0222572 A1* | 9/2009 | Fujihara | 709/232 |
| 2010/0002940 A1* | 1/2010 | Aoki et al. | 382/209 |
| 2010/0039380 A1* | 2/2010 | Lanier | 345/156 |
| 2010/0057586 A1* | 3/2010 | Chow | 705/26 |
| 2010/0060647 A1* | 3/2010 | Brown et al. | 345/473 |
| 2010/0094634 A1* | 4/2010 | Park | 704/270 |
| 2010/0134501 A1* | 6/2010 | Lowe et al. | 345/474 |
| 2010/0222144 A1* | 9/2010 | Ohba et al. | 463/35 |
| 2010/0259538 A1* | 10/2010 | Park et al. | 345/419 |
| 2011/0091070 A1* | 4/2011 | Havaldar et al. | 382/103 |
| 2011/0197201 A1* | 8/2011 | Yoo et al. | 719/313 |
| 2011/0304629 A1* | 12/2011 | Winchester | 345/473 |
| 2012/0030291 A1* | 2/2012 | Silver | 709/206 |
| 2012/0089395 A1* | 4/2012 | Chavez et al. | 704/235 |
| 2012/0113126 A1* | 5/2012 | Koch et al. | 345/473 |
| 2012/0120270 A1* | 5/2012 | Li et al. | 348/222.1 |
| 2012/0139899 A1* | 6/2012 | Winchester | 345/419 |
| 2012/0214586 A1* | 8/2012 | Rowe et al. | 463/30 |
| 2012/0218375 A1* | 8/2012 | Hetherington et al. | 348/14.12 |
| 2012/0301042 A1* | 11/2012 | Komatsu et al. | 382/254 |
| 2013/0235228 A1* | 9/2013 | Sen | 348/222.1 |

\* cited by examiner

FIG.5

| LOG-IN ID | CHARACTER | BACKGROUND |
|---|---|---|
| 0003 | CAT1 | BACKGROUND2 |
| 0012 | COW4 | BACKGROUND5 |
| ... | ... | ... |

| GAME | COSTUME |
|---|---|
| GAME A | COMBAT UNIFORM 2 |
| GAME B | SCHOOL UNIFORM 5 |
| ... | ... |

| FACIAL EXPRESSION TYPE | AMOUNT OF INTEREST | LOWER LIMIT CRITERIA VALUE | UPPER LIMIT CRITERIA VALUE |
|---|---|---|---|
| MOUTH OPENING | DISTANCE BETWEEN UPPER AND LOWER LIPS | $\Delta y1$ | $\Delta y2$ |
| EYE CLOSING | DISTANCE BETWEEN UPPER AND LOWER EYELIDS | $\Delta y3$ | $\Delta y4$ |
| SMILE | CHANGE OF INNER/OUTER CORNER OF EYE | 0 | $\Delta y5$ |
| ... | ... | ... | ... |

122 124 126 128

120

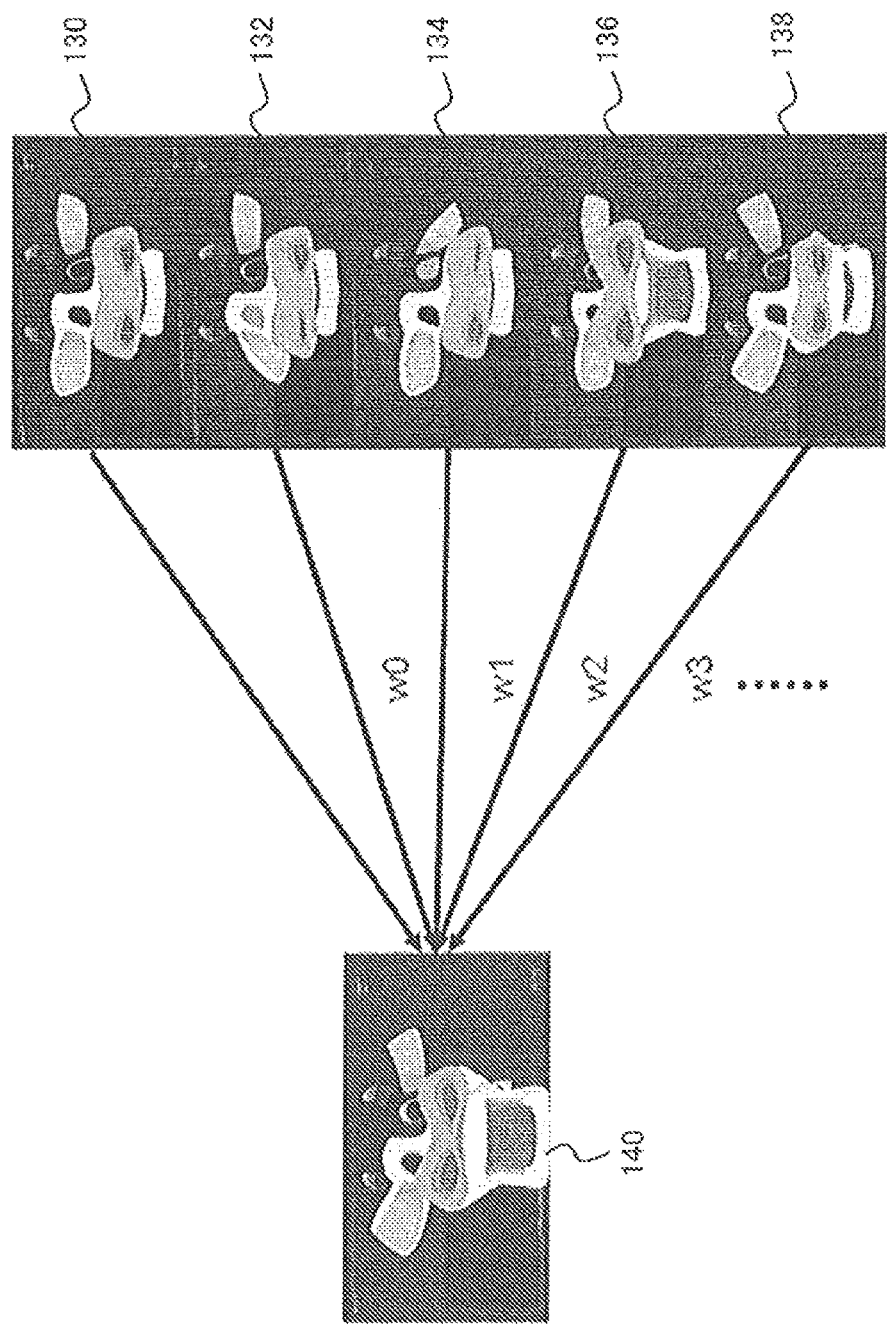

| PATTERN | COMMAND ID | COMMAND |
|---|---|---|
| KEEP LAUGHING 5 SECONDS | 007 | STARTING DANCING |
| CLOSING LEFT EYE → OPENING MOUTH AND CLOSING RIGHT EYE | 082 | SHOWER OF LIGHT |
| NODDING HEAD | 022 | APPROVAL |
| SHAKING HEAD | 023 | DENIAL |
| FIVE WINKS | 009 | INVITATION ANIMATION |
| INCLINING HEAD | 034 | CALLING FOR HELP |
| ... | ... | ... |

INFORMATION PROCESSING DEVICE CAPABLE OF DISPLAYING A CHARACTER REPRESENTING A USER, AND INFORMATION PROCESSING METHOD THEREOF

BACKGROUND OF THE INVENTION

1. Field of the Invention

The present invention relates to an information processing device and an information processing method used for a conversation system for allowing users to converse with each other via a network.

2. Description of the Related Art

Television conference systems allowing users to converse with each other without feeling the distance by respectively receiving data of the image and voice of the other user in distant place via a network and by outputting the data as a displayed image and sound have been put into practical use. Nowadays, personal computers, mobile terminals, and game devices, wherein a web camera is mounted, have been prevailed, and networks are expanded. As a result of such contributing factors, a technology of video chatting, television-phones, or the like, which is not limited to specific scene such as conferences or the like, but which can also be casually enjoyed individually, regardless of time and venue have also become common (see, for example, U.S. patent application 2009/222572).

In order to enjoy more natural conversations by utilizing the above technology, it is important to maintain real-time-ness. However, in order to transmit and output high-quality image and sound data without latency, proper data processing capability and proper communication band are required. Therefore, a technology is desired, which allows users to enjoy conversations casually and naturally, even in such an environment in which the communication band is limited or one information processing device performs some sorts of processing in parallel.

RELATED ART LIST

U.S. patent application 2009/222572

SUMMARY OF THE INVENTION

The present invention addresses the aforementioned issue, and a purpose thereof is to provide a technology capable of allowing a user to enjoy conversations in real time with another user without straining resources for processing or on communication band. Another purpose of the present invention is to provide a technology for enhancing the entertainment experience in such conversations.

According to an embodiment of the present invention, an information processing device is provided. The information processing device includes: an image data storage operative to store data on models of a character representing a user, the model including a plurality of facial expression models providing different facial expressions; a facial expression parameter generating unit operative to calculate a degree of facial expression for each facial expression type as a facial expression parameter by sequentially analyzing input moving image data acquired by capturing an image of a user, by deriving a numerical value representing the shape of a portion of a face for each input image frame, and by comparing the numerical value with a criteria value defined in advance; a model control unit operative to first determine a weight for each of the plurality of facial expression models stored in the image data storage by using the facial expression parameter calculated by the facial expression parameter generating unit and a volume level obtained from voice data of the user acquired at the same time with the capturing of the image, to synthesize the plurality of facial expression models, and to determine an output model of the character for each point of time corresponding to each of the input image frames; a moving image parameter generating unit operative to generate a moving image parameter for generating animated moving image frames of the character including the output model determined by the model control unit for respective points of time; and an output unit operative to synchronize the moving image parameter generated by the moving image parameter generating unit and the voice data and to sequentially output.

According to another embodiment of the present invention, an information processing method is provided. The information processing method includes: calculating a degree of facial expression for each facial expression type as a facial expression parameter by sequentially analyzing input moving image data acquired by capturing an image of a user, by deriving a numerical value representing the shape of a portion of a face for each input image frame, and by comparing the numerical value with a criteria value defined in advance; determining a weight for each of the models of a character representing a user, the models including a plurality of facial expression models providing different facial expressions stored in a memory by using the calculated facial expression parameter and a volume level obtained from voice data of the user acquired at the same time with the capturing of the image; reading data of the plurality of facial expression models from the memory; synthesizing the plurality of facial expression models while weighing with the weights, and determining an output model of the character for each point of time corresponding to each of the input image frames; generating a moving image parameter for generating animated moving image frames of the character including the output model for respective points of time; and synchronizing the moving image parameter and the voice data, and outputting sequentially.

Optional combinations of the aforementioned constituting elements, and implementations of the invention in the form of methods, apparatuses, systems, computer programs, and recording media that store computer programs may also be practiced as additional modes of the present invention.

BRIEF DESCRIPTION OF THE DRAWINGS

FIG. 5 shows an example of a data structure for a basic image ID table according to the embodiment;

FIG. 6 shows another example of a data structure for the basic image ID table according to the embodiment;

FIG. 7 shows an example of a data structure for a facial expression criterion according to the embodiment;

FIG. 8 schematically shows the way a model control unit synthesizes the face of a character according to the embodiment.

DETAILED DESCRIPTION OF THE INVENTION

The invention will now be described by reference to the preferred embodiments. This does not intend to limit the scope of the present invention, but to exemplify the invention.

Figure 1:
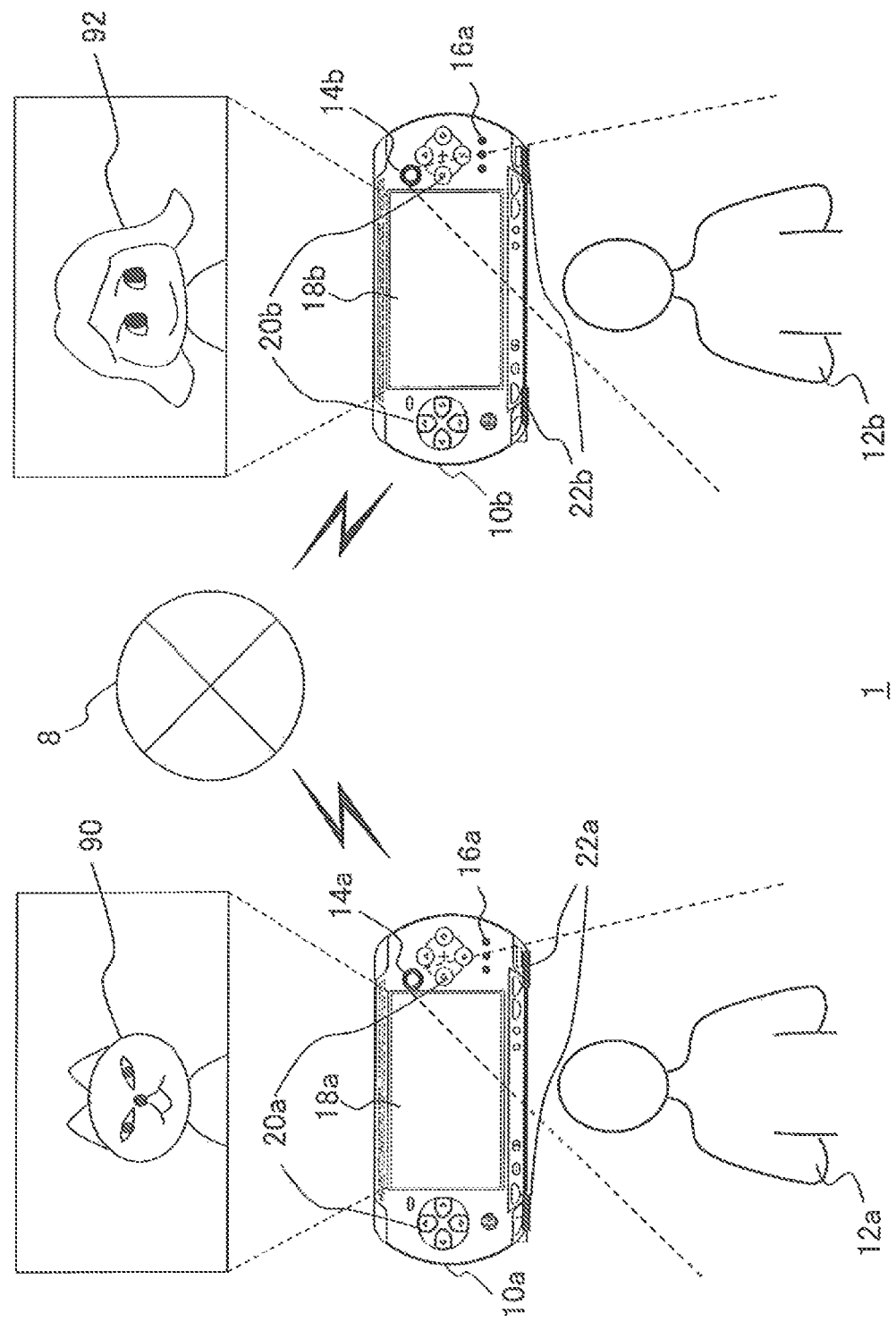
FIG. 1 shows an environment in which a conversation system applicable to the embodiment is used.

FIG. 1 shows an environment wherein a conversation system, to which the embodiment is applicable, is used. The conversation system 1 includes a plurality of information processing devices, such as an information processing device 10a that is operated by a user 12a, an information processing device 10b that is operated by a user 12b, or the like. Each of the information processing devices 10a and 10b is connected to a network 8, such as the internet, a LAN (Local Area Network), or the like, and transmits data on images and sounds to the other device, whereby conversations between users are realized. The information processing devices 10 and the network 8 may be connected with each other wirelessly as shown in FIG. 1, or may be connected via cable.

According to the embodiment, instead of the real images of the users 12a and 12b who operate the information processing devices 10a and 10b respectively, a virtual character representing each of the users are rendered by computer graphics (CG) and shown to the other user. That is, each user converses with a character displayed on the device operated by the user. The character can be also referred to as the avatar of the other user in the conversation.

This character reflects the appearance of the other user originally in the conversation and moves its mouth in accordance with the voice as if speaking. Whereby, the same impression as that of the case in which the user converses with the other user face to face can be given. Further, the user can enjoy conversations using images even in case the user would not like to show the real face or the whereabouts. Furthermore, it is also possible to add effects specific to the CG and to enhance the entertainment experience. The number of the users who make a conversation may be more than two. In this case, a plurality of characters may be displayed on each device. A character representing the user himself/herself may also be displayed at the same time.

The information processing devices 10a and 10b may be, for example, mobile terminals, game devices, or personal computers and implement the conversation function by loading application programs for implementing the conversation system, respectively. Information processing device 10a comprises a camera 14a, a microphone 16a, and a display 18a on its front face. In addition, the information processing device 10a comprises an input device 20a for acknowledging an instruction for start-up of the application, and various types of instructions following the start-up from the user 12a, and a speaker 22a for outputting sounds. The information processing device 10b is configured in the similar manner.

In FIG. 1, the user 12a and the information processing device 10a, and the user 12b and the information processing device 10b are shown separately to be easily understood. However, the information processing devices 10a and 10b are assumed to be portable terminals with which the respective users 12a and 12b can make various types of operations by holding the either side thereof. Therefore, the camera 14a, the microphone 16a, the display 18a, the input device 20a and the speaker 22a are provided with the main body of the information processing device 10a in an integrated fashion.

Alternatively, one of or all of the camera 14a, the microphone 16a, the display 18a, the input device 20a and the speaker 22a may have a housing separate from the main body of the information processing device 10a and may be connected with the main body of the information processing device 10a by cable or wirelessly. For example, the input device 20a may be implemented by a keyboard, a mouth, a track ball, a remote controller, or the like, or may be implemented by a touch panel provided on the surface of the display 18a or on the outer surface of the information processing device 10a. Further, the display 18a and the speaker 22a may be implemented by a commonly-used television.

The camera 14a is a digital video camera comprising an image pickup device such as a CCD (Charge Coupled Device), CMOS (Complementary Metal Oxide Semiconductor), or the like and takes an image of the user 12a and generates moving image data. The microphone 16a acquires a voice uttered by the user 12a and generates voice data. The display 18a is, for example, a liquid crystal display, a plasma display, an organic electroluminescent (EL) display, or the like, and displays a character representing the other user in the conversation. In the example shown in FIG. 1, a character 90 of the other user 12b is displayed on the display 18a, which the user 12a watches, and a character 92 of the user 12a is displayed on the display 18b, which the user 12b watches. The speaker 22a outputs the voices of the other user in the conversation as acoustic sounds.

Figure 2:
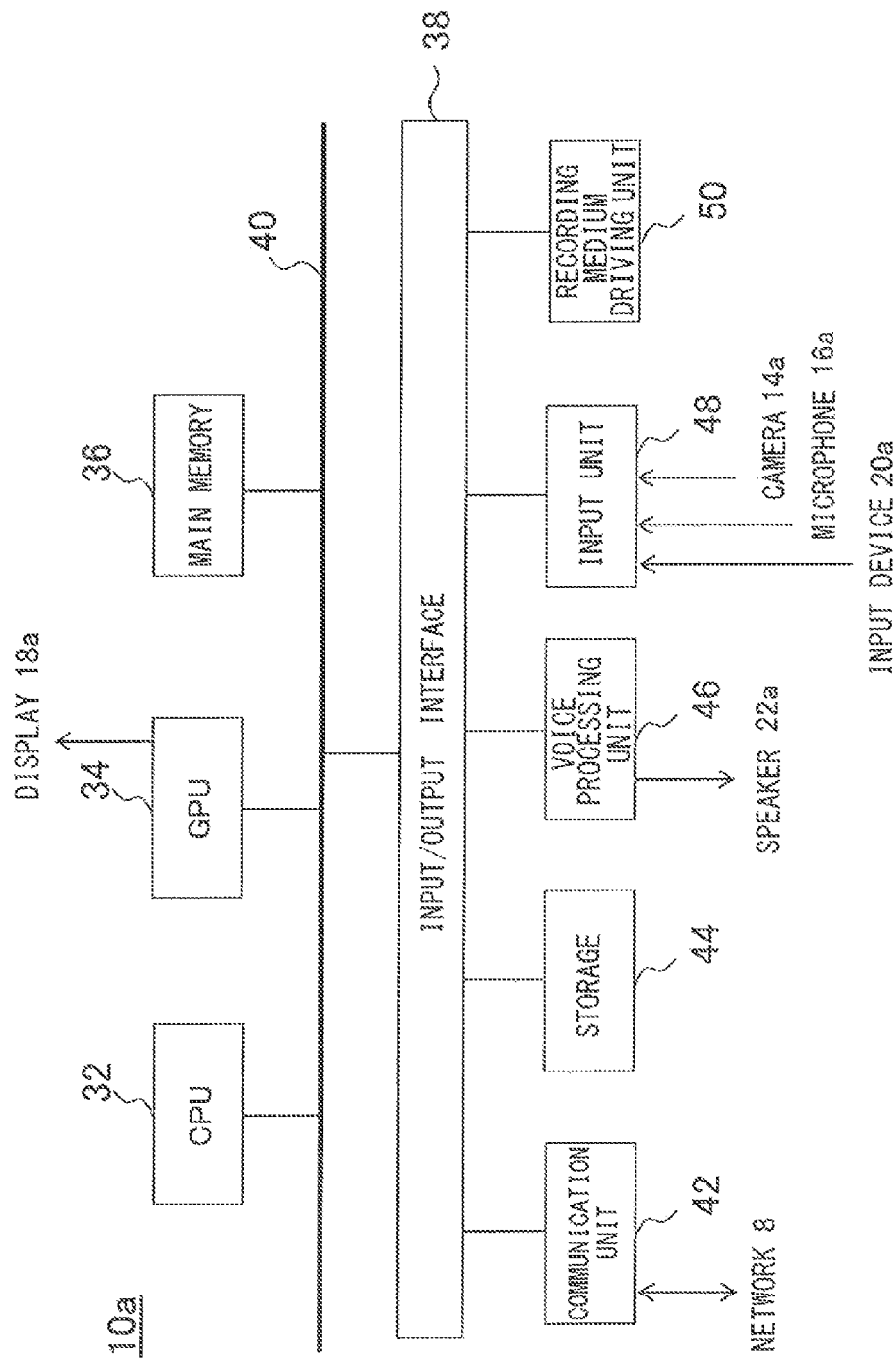
FIG. 2 shows the internal circuit structure of an information processing device according to the embodiment.

FIG. 2 shows the internal circuit structure of an information processing device 10a. The information processing device 10a includes a CPU (Central Processing Unit) 32, a GPU (Graphics Processing Unit) 34, and a main memory 36. The CPU 32 controls signal processing and/or internal constituent elements based on programs, such as an operating system, an application, or the like. The GPU 34 performs image processing in accordance with an instruction from the CPU 32 and outputs the image to the display 18a or the like.

These respective elements are connected among each other via a bus 40. In addition, an Input/Output Interface 38 is connected to the bus 40. The I/O interface 38 is connected with a communication unit 42, a storage 44, such as a hard disk drive, a non-volatile memory, or the like, a voice processing unit 46, an input unit 48, and a recording medium driving unit 50. The communication unit 42 comprises a peripheral device interface, such as a USB interface, an IEEE1394 interface, or the like, and a network interface with mobile communications, such as a wired or wireless LAN, a 3G network, an LTE (Long Term Evolution) network, or the like. The voice processing unit 46 plays back voice data and outputs the voice data to the speaker 22a. The input unit 48 acquires input data from the camera 14a, the microphone 16a, and input device 20a, respectively. The recording medium driving unit 50 drives a removal recording medium, such as a magnetic disk, an optical disk, a semiconductor memory, or the like.

The CPU 32 controls the entire information processing device 10a by executing an operating system stored in the storage 44. The CPU 32 further executes various types of programs read out from the removal recording medium and loaded into the main memory 36, or downloaded via the communication unit 42.

The GPU 34 is provided with a geometry-transfer engine function and a rendering processor function, performs rendering processing in accordance with a rendering instruction from the CPU 32 and stores a display image into a frame buffer (not shown). Then the GPU 34 converts the display image stored in the frame buffer to a video signal and outputs the signal to the display 18a. Alternatively, the GPU 34 transmits the signal to the information processing device 10b of the other user via the communication unit 42. The voice processing unit 46 plays back the voice data acquired from the information processing device 10b of the other user via the communication unit 42 and outputs audio data to the speaker 22a in accordance with the instruction from the CPU 32.

Detailed explanation is omitted with respect to a process of establishing communication with the information processing device of the other user via a network 8, a process of acquiring voice data of the other user, and a process of outputting audio data, since one of the technologies commonly used for telephone, telephone conference, television telephone, voice chat, video chat, or the like can sufficiently be applied. Hereinafter, an explanation will be given while focusing on a method for allowing a character representing a user to move.

Figure 3:
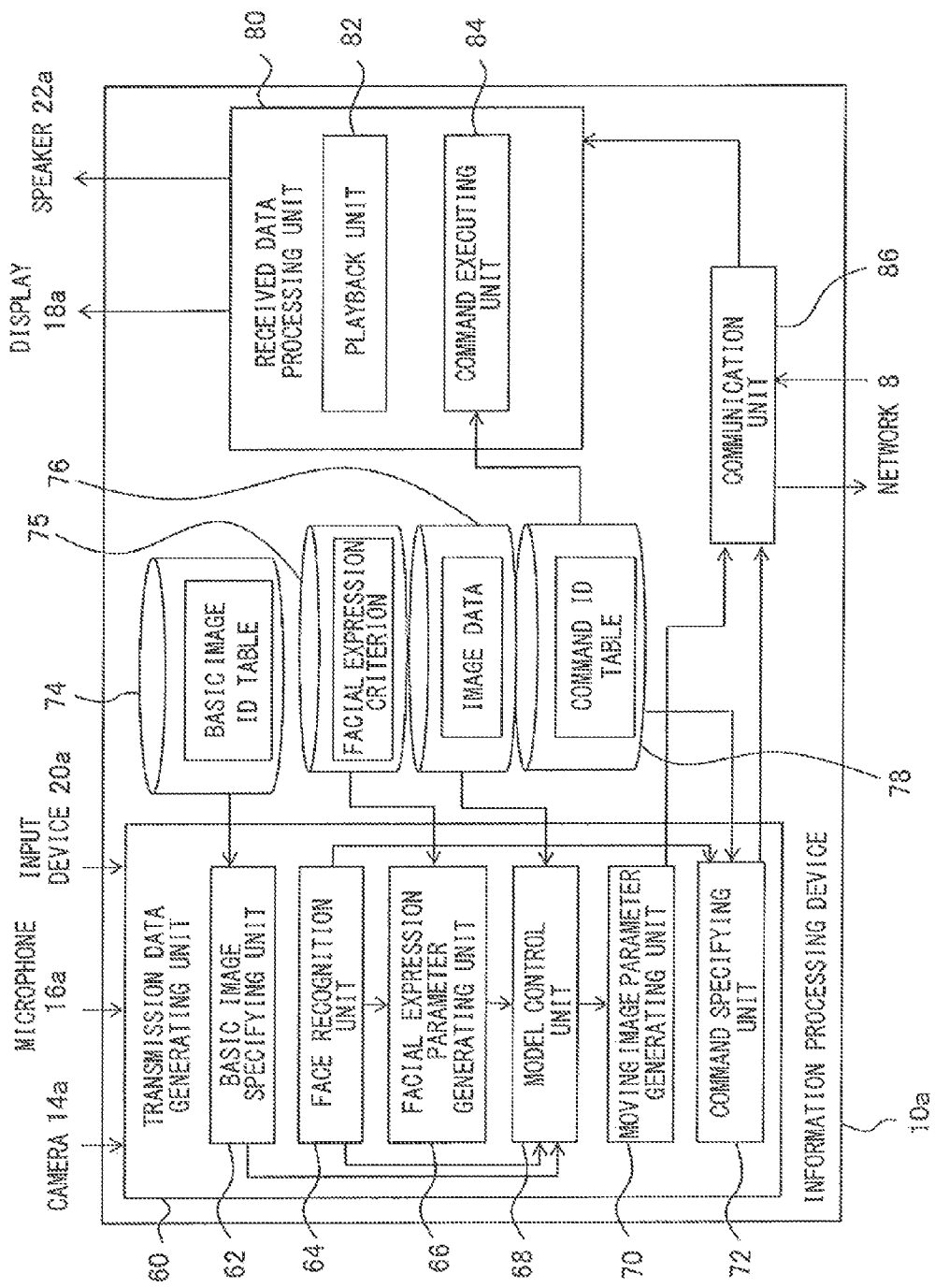
FIG. 3 shows the detailed structure of the information processing device according to the embodiment.

FIG. 3 shows the detailed structure of the information processing device 10a. The elements depicted in FIG. 3 as functional blocks for performing various processes are implemented in hardware such as a CPU, memory, or other LSI's, and in software such as a programs etc., loaded into the memory. Therefore, it will be obvious to those skilled in the art that the functional blocks may be implemented in a variety of ways, by hardware only, software only, or a combination thereof.

The information processing device 10a includes a transmission data generating unit 60, a received data processing unit 80, and a communication unit 86. The transmission data generating unit 60 acquires an image and a voice of the user 12a who operates the device and, based thereon, generates data to be transmitted to the information processing device 10 operated by the other user. The received data processing unit 80 processes information transmitted from the information processing device 10 operated by the other user, and provides the appearance of a speaking character that represents the other user. The communication unit 86 transmits and receives necessary data via the network 8. The communication unit 86 can be implemented as hardware by the communication unit 42 shown in FIG. 2.

The information processing device 10a further includes a basic image information storage 74 that stores a basic image ID table, a facial expression criterion storage 75 that stores a facial expression criterion, an image data storage 76 that stores image data, and a command information storage 78 that stores a command ID table. Herein after, explanations will be given while assuming that the information processing device 10a establishes communication with the information processing device 10b and the user 12a and user 12b who operate respective devices converse with each other as shown in FIG. 1.

In this process, the transmission data generating unit 60 acquires image data and voice data of the user 12a, generates a moving image parameter of a character representing the user 12a based on the acquired data, synchronizes the parameter with the voice data, and transmits them to the information processing device 10b of the other user from the communication unit 86, sequentially. In this specification, the moving image parameter is a parameter that controls the motion or the like of a character, and is a group of data that corresponds to respective frames of animation. By first transmitting basic data such as a polygon set of a character, or the like, an image of each frame can be generated on the moment while using the moving image parameter. Concrete sorts of control parameters vary depending on methods for displaying animation. As the moving image parameter, the frame data of the moving image itself may be transmitted.

Further, when the facial expression of the user 12a falls into a specific pattern, the identification information of a command corresponding to the pattern is transmitted from the communication unit 86 to the information processing device 10b of the other user. The received data processing unit 80 generates and plays back a moving image, and plays back sound by using the moving image parameter and the voice data received from the information processing device 10b of the other user. The received data processing unit 80 also executes a command based on the received identification information of the command.

During a mode where the user's own character is also displayed on the user's information processing device 10a with the other user's character, the received data processing unit 80 displays moving images by also using a moving image parameter generated by the transmission data generating unit 60 in the own device. Depending on the contents of a command, the command is executed in the own device.

The transmission data generating unit 60 is mainly implemented by the CPU 32, the GPU 34, and the input unit 48, and includes a basic image specifying unit 62, a face recognition unit 64, a facial expression parameter generating unit 66, a model control unit 68, a moving image parameter generating unit 70, and a command specifying unit 72. The basic image specifying unit 62 specifies a basic image of the character representing the user 12a. The face recognition unit 64 performs face recognition by analyzing each image frame of the image of the user 12a captured by the camera 14a. The facial expression parameter generating unit 66 converts the facial expression of the user 12a to a numerical value based on the shape of a predetermined part of the face. The model control unit 68 determines an output model of the character for each point of time. The moving image parameter generating unit 70 generates a moving image parameter for generating an image including the output model. The command specifying unit 72 specifies a command corresponding to a pattern of the facial expression of the user 12a.

The received data processing unit 80 is mainly implemented by the CPU 32, the GPU 34, and the voice processing unit 46, and includes a playback unit 82 and a command executing unit 84. The playback unit 82 uses the moving image parameter and the voice data received from the information processing device 10b of the other user, generates a moving image and plays back the voice data, and outputs the image and the voice to the display 18a and speaker 22a, respectively. The command executing unit 84 executes a command based on the identification information of the command.

First, the basic image specifying unit 62 of the transmission data generating unit 60 specifies the basic image of the user 12a by referring to the basic image ID table stored in the basic image information storage 74. Here, the "basic image" refers to the model of the character representing the user 12a and can be defined for each user. For example, a character generating tool (not shown) is provided separately, and a user generates his/her own character by selecting and combining preferred objects from a plurality of sorts of head shapes, respective parts of face, styles of hair, colors of hair, cloths, accessories, or the like displayed on the character generating tool, respectively. Aback ground image, a frame, or the like may also be provided for the selection. As a tool like this, a tool that is practically used in common applications can be applied.

After the user 12a determines the model of his/her own character or the like in the aforementioned manner, the identification information of the basic image including the model and the identification information of the user 12a are associated with each other and stored in the basic image ID table. The basic image specifying unit 62 acquires, when the user 12a activates the information processing device 10a, etc., the identification information of the user (e.g., a log-in ID or the like) and specifies the identification information of the basic image (e.g., the identification information of a model, an address to which geometry data is to be stored, or the like) by referring the basic image ID table based on the acquired identification information of the user.

Meanwhile, information other than the identification information of the user 12a, for example the status of the user 12a at the point of time when the user starts a conversation may also be used in determining the basic image. For example, in case the information processing device 10a also works as a game device, and in case a user starts a conversation with the other user 12b during the execution of a game or by switching from the game, on one hand, the model of the face of the character may be determined by the identification information of the user 12a. On the other hand, the cloths or the like which the character puts on may be defined as the costume of a character of the game which the user has been played immediately before, by which the conversation can be warmed up or the entertainment experience can be enhanced. In a similar manner, the costumes or the background image may be determined by whereabouts of the user, time, season, or the like.

In any case, provided that data for a model to be defined as a basic image and a back ground image can be prepared, the data and the identification information of an attribute for selecting one of the models or the images included in the data are associated with each other in the basic image ID table. The basic image specifying unit 62 specifies a basic image by acquiring the identification information of the attribute when starting a conversation. A detailed explanation on an illustrative example will be given later.

The face recognition unit 64 sequentially analyzes the moving image data of the user 12a acquired from the camera 14a, and performs face recognition of the user 12a for respective input image frames. More specifically, the face recognition unit 64 specifies the position and the shape of respective parts of the face (e.g., face region, eyes, a nose, a mouth, or the like) in the image, and extracts the coordinates of respective feature points, by a template matching technique with the average face image, etc. Anyone of various image analysis techniques that are used practically as facial recognition techniques may be applied to the aforementioned processing performed by the face recognition unit 64.

The facial expression parameter generating unit 66 converts, for each type of facial expression, the degree of the facial expression to a numerical value (hereinafter, referred to as "facial expression parameter") by comparing a parameter obtained from the coordinates of the feature point of respective parts extracted by the face recognition unit 64 with a criteria value defined in advance. The criteria value used in this process is stored in the facial expression criterion storage 75 as a facial expression criterion.

In order to convert the degree of facial expression to a numerical value, the value when the facial expression is not made at all and the value when the facial expression is maximally made are defined as a facial expression criterion, in advance. For example, in case of converting the degree of opening of a mouth to a numerical value, the focus is put on the distance between the upper lip and the lower lip, and the distance when the mouth of an average face is closed is set as the lower limit and the distance when the mouth is maximally opened on the average face is set as the upper limit. By checking where the actual distance lies in the range between the lower limit and the upper limit, and by normalizing the actual distance while setting the lower limit to 0 and the upper limit to 1, the degree of opening of the mouth can be obtained as a numerical value between 0 and 1.

When comparing with the criteria value, processing for normalization based on the size of the face region or the like, processing for correcting the tilt of the face, or the like is performed as appropriate. By defining the lower limit criteria value and the upper limit criteria value for not only the opening and closing of mouth, but also for a plurality of facial expressions such as the opening and closing of eyes, smiles, sadness, anger, or the like, the facial expression parameters for respective facial expressions are obtained for each of the input image frames.

The model control unit 68 reads the data of a corresponding model, image, or the like from the image data storage 76 based on the basic image specified by the basic image specifying unit 62. Further, by using the tilt of the face region detected by the face recognition unit 64 and/or the facial expression parameter calculated by the facial expression parameter generating unit 66, an output model of the character for each point of time corresponding to each of the input image frames is generated. The data stored in the image data storage 76 includes: a) the geometry data of a character and/or a costume generated by a user, etc; b) the data of a background image; c) various parameters used for rendering with three-dimensional graphics, or the like.

As the three-dimensional model of a character, data on a plurality of facial expression model having different facial expressions is provided in advance, other than a criterial facial expression model. The model control unit 68 synthesizes the plurality of facial expression models while weighing by weights in accordance with the facial expression parameters acquired from the facial expression parameter generating unit 66. Whereby, the model control unit 68 generates an output model having a facial expression similar as that of the user for each point of time. In this process, the tilt of the facial region detected by the face recognition unit 64 is reflected to the tilt of the head of the output model, at the same time. The body of the character is generated so as to wear a costume included in the basic image. The parameter of the output model generated in this manner is provided to the moving image parameter generating unit 70 with the data of the background image.

According to the embodiment, by not only allowing the character to make a facial expression similar to the actual facial expression of the user, but also by allowing the character to appear as if the character is speaking, higher realism is presented. For example, if the movement of the mouth of the character can be synchronized with the voice utterance of the user, and the shape of the mouth (lips) can be associated with the pronunciation of the user, the voice of the user and the image of the character agree with each other, which allows users to enjoy more natural conversations.

However, acquiring and tracing the actual shape of the mouth of the user for each one frame, or determining the shape of the mouth in accordance with the sound acquired by voice analyzing increases the processing cost and thus is apt to produce latency. As a result, the more limitation is put on the processing resources and/or the communication band, the more difficult the real-time image representation becomes. Therefore, according to the embodiment, by taking into account the volume level, the shape of mouth, and the utterance time comprehensively, the image generation of the character who speaks in agreement with the voice is implemented even under the circumstances where processing resources and the like are limited.

More specifically, a shape of mouth that typically appears while a person speaks is extracted and selected, and the vocal model having the shape of the mouth is included in the facial expression models. Then the vocal models are synthesized while the weights thereof are changed in correspondence with time during the period when the user actually speaks. For example, provided as the facial expression models are a shape where a mouth is widened vertically or widened as a whole (e.g., the shape of the mouth when pronouncing the short vowel "a"), a shape where a mouth is widened horizontally (e.g., the shape of the mouth when pronouncing the short vowel "i"), a shape where a mouth is puckered up (e.g., the shape of the mouth when pronouncing the vowel "u"). Then the facial expression models are synthesized while respective weights are changed with time.

The shapes of mouth to be selected are not limited to the aforementioned examples, and may differ depending on the language. For example, the shape of mouth to be selected may be a mouth being widened vertically, may be a pouty mouth, etc. In any case, the shapes of mouth when pronouncing typical sounds are selected preferentially. In this manner, a combination of a plurality of selected mouth shapes varies with time while changing the degrees thereof, respectively. Therefore, fine movements of mouth that is not merely the opening and closing of mouth can be presented with easy calculation even with a small number of models. Further, the actual volume level, and the actual degree of opening of a mouth of a user are taken into consideration in determining the aforementioned weights. Thereby, even when synthesizing with a three dimensional model of another facial expression as described above, the overall degree of opening of a mouth reflects actual values thereof. An explanation on an illustrative example will be given later.

The moving image parameter generating unit 70 generates a moving image parameter required for displaying animation of a character. For example, by rendering output models consecutive in time while morphing the output models, more smooth animated moving image can be generated. The moving image parameter generating unit 70 further compresses and encodes the generated moving image parameters and outputs the parameters sequentially to the communication unit 86. The moving image parameters are synchronized with voice data in the communication unit 86 and transmitted to the information processing device 10*b* of the other user.

The command specifying unit 72 monitors the time variation of the coordinates of the feature point of respective parts of the face extracted by the face recognition unit 64, or the time variation of the facial expression recognized from the feature point, and determines whether or not the change in the facial expression that falls into a pattern defined in the command ID table stored in the command information storage 78 occurs. The defined pattern may be a natural facial expression that occurs during a conversation, such as "a facial expression deemed to be a smile has lasted more than or equal to 5 seconds," etc, or may be a facial expression, which a user makes consciously in order to trigger a command, such as "after the left eye is closed, the mouth is opened and the right eye is closed," etc. In any case: a) a change in one of the parts of head or face; or b) a combination of the changes in the parts, the chronological order thereof, and c) time limit for recognizing the changes as one pattern are defined.

If a change corresponding to one of those patterns is determined to have occurred, the identification information of the command, which is associated with the pattern in the command ID table is identified. Here, "command" refers to a command that gives a change to an image displayed on at least one of the information processing device 10*a* operated by the user and the information processing device 10*b* of the other user. For example, in case that "a facial expression deemed to be a smile has lasted more than or equal to 5 seconds," by generating a command that makes the character of the user start dancing, the emotion of the user at the time can be represented more effectively.

In case that "after the left eye is closed, the mouth is opened and the right eye is closed," a command that triggers a change, which the user would like to give to the image intentionally, is generated. For example a command that processes an image so that a shower of light flows on the screen image is generated. The command specifying unit 72 identifies the identification information of the command from the command ID table, and outputs the identification information to the communication unit 86, accordingly.

The playback unit 82 of the received data processing unit 80 acquires from the communication unit 86 the moving image parameter and the voice data transmitted from the information processing device 10*b* of the other user, renders a frame image, performs a play-back process, and outputs to the display 18*a* and the speaker 22*a*, accordingly. The command executing unit 84 acquires from the communication unit 86 the identification information of the command transmitted from the information processing device 10*b* of the other user and executes the command. More specifically, the command executing unit 84 refers to the command ID table stored in the command information storage 78, reads a command execution file, which is further associated with the identification information of the command, from the main memory 36 or the like, and executes described script, etc.

In this manner, by transmitting only the moving image parameter and/or the identification information of the command to the information processing device 10*b* of the other user, which is the destination of transmission, and by allowing the information processing device 10*b* of the other user to execute a part of processes related image displaying, the processing load of the information processing device 10*a*, which is the source of transmission, is decreased. Further, from a comprehensive point of view, data to be transmitted and received between devices when making a conversation can be reduced, thus, a necessary band required for data transmission can be cut down. Alternatively, a moving image data may be generated at the source of transmission, and the data may be merely play-backed at the destination of transmission. One of those modes may be selected adaptively depending on the availability of communication band and/or the processing capabilities.

Figure 4:
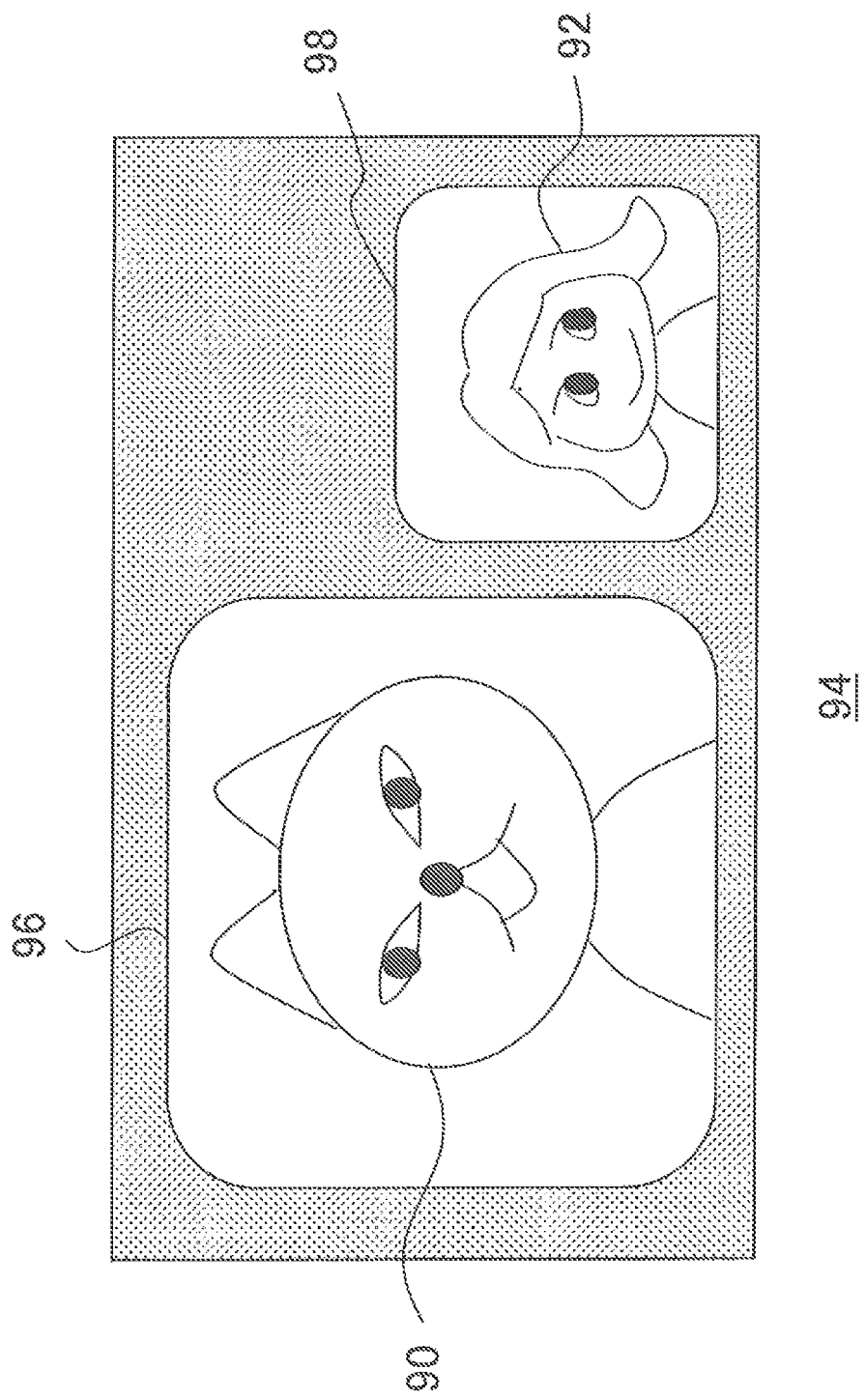
FIG. 4 shows an example of an image to be displayed according to the embodiment.

FIG. 4 shows another example of image to be displayed on the display 18*a*. This exemplary display image 94 includes an other-party character window 96 for displaying the character 90 of the other user and an own character window 98 for displaying the character 92 of the user himself/herself. To the other-party character window 96, the moving image generated according to the moving image parameter of the character 90 of the other user, the parameter being transmitted from the information processing device 10*b* of the other user, is output. To the own character window 98, the moving image of the character 92 of the user himself/herself is output. In this case, the moving image of the character 92 of the user himself/herself is generated by allowing the received data processing unit 80 to receive the moving image parameter directly from the transmission data generating unit 60 in the own device.

If the command specifying unit 72 determines the change in the facial expression that falls into a pattern defined in the command ID table occurs, the command specifying unit 72 transmits the identification information of the corresponding command to the information processing device 10*b* of the other user along with notifying the command executing unit

84 in the own device about the information. The command executing unit 84 executes the command on an image in the own character window 98.

However, in case of executing a command accompanied by displaying of animation of a character (e.g., the character of the user start dancing, etc,) the moving image parameter or the moving image data of animation generated in the own device may be transmitted to the information processing device 10*b* of the other user, instead of transmitting the identification information of the command. In case the animation is defined as a stereo-type movement, the moving image parameter and/or the animation of the character of the user who is operating may be generated and stored in a storage or the like in advance.

In the mode where the moving image data is transmitted instead of the identification information of the command, the information processing device 10*b* of the other user is merely required to play back the transmitted moving image data, which reduces its processing load. Which of the identification information of the command, the moving image parameter, or the moving image data is to be transmitted may be determined adaptively depending on the content of the command, the processing capabilities of the information processing device, the availability of communication band, or the like.

As another example, the command may be executed on both of the other-party character window 96 and the own character window 98. For example, in case that "a facial expression deemed to be a smile has lasted more than or equal to 5 seconds" as described above, the character 90 of the other user may also be controlled so as to start dancing together with the character 92 of the user. In the mode where the moving image data is transmitted instead of the identification information of the command as described above, by first transmitting the moving image data of animation of the own character to the information processing device 10*b* of the other user, and by allowing the information processing device 10*b* to send back the moving image data of the character of the other user, the characters of both users can be displayed so as to start dancing.

Alternatively, the command may be executed only when both the user and the other user change their facial expressions in a same pattern in a predetermined time range. For example, only in case "a facial expression deemed to be a smile has lasted more than 5 or equal to seconds" for both users, the character 92 of the user and the character 90 of the other user may be controlled so as to start dancing. In such a case, the command specifying unit 72 recognizes the occurrence of a pattern and transmits one of: a) the identification information of the command; b) the moving image parameter; or c) the moving image data to the information processing device 10*b* of the other user, accordingly, along with notifying the command executing unit 84 thereof. The command executing unit 84 performs processing for executing a command such as, the generation of a moving image, the play-back of the moving image, or the like for images of both devices, only when the identification information of the same command, or a corresponding moving image parameter or moving image parameter are sent from the information processing device 10*b* of the other user.

FIG. 5 shows an example of a data structure for a basic image ID table stored in the basic image information storage 74. The basic image ID table 100*a* includes a log-in ID field 102, a character field 104, and a background field 106. An identification number, which is given for each user beforehand is recorded in the log-in ID field 102. Information for identifying a character model generated by a user in advance as described above, and information for identifying a selected background image are recorded for each user in the character field 104, and in the background field 106, respectively. For example, the basic image for the user whose log-in ID is "0003" is an image in which a character referred to as "cat 1" is displayed on the background referred to as "background 2."

FIG. 6 shows another example of a data structure for the basic image ID table. The basic image ID table 100*b* is referred to in combination with the basic image ID table 100*a* shown in FIG. 5 in the mode in which the character of the user puts on the costume of a character of the game which the user has been played immediately before as described above. The basic image ID table 100*b* includes a game field 108 that records information for identifying a game, and a costume field 110 that records information for identifying a model of a costume of a main character for each game, or the costume of a character selected by a user.

For example, in case the user described above has been playing a game referred to as "game A," the character of the model referred to as "cat 1" puts on the costume of a model referred to as "combat uniform 2," which is defined as the basic image. The information for identifying a game that has been played immediate before is recorded in a processing history of the information processing device 10*a*, or the like. The model of the character identified in the character field 104 of the basic image ID table 100*a* shown in FIG. 5 may put on default clothes. On a specific condition (e.g., a game has been played immediate before, etc,) the information recorded in the basic image ID table 100*b* shown in FIG. 6 may be prioritized.

As described above, the game field 108 of the basic image ID table 100*b* shown in FIG. 6 may be replaced with any attribute indicating the status where the user is put, such as, whereabouts of the user, time, weather, or the like. The costume field 110 may also be replaced with a field that records the identification information of background images. For example, in case of determining a background image based on the whereabouts of the user, graphics of a school prepared beforehand may be defined as the background image while being associated with "school," or graphics of a virtual room generated by the user may be defined as the background image while being associated with "my room." Alternatively, a landscape photography taken by the user at the location may be defined as the background image while being associated with "current whereabouts."

In such a case, by allowing the user to select the whereabouts of the user from, for example, "current whereabouts," "school," "my room," or the like, the basic image specifying unit 62 determines the background image associated therewith. The costume may be changed depending on the whereabouts. By providing a camera (not shown) different from the camera 14*a* on the back surface of the information processing device 10*a*, a landscape which the user 12*a* views can be captured as needed even during the conversation. By setting the image captured in this way as the background image, an image in which a character as the avatar of the user is present in the place where the user is actually present can be shown with realism to the other user in the conversation.

A moving image of a landscape continuously captured by the camera may be set as the background image in real time. In this manner, for example, a character strolling in a similar manner as the user strolls can be shown to the other user, which can present the conversation more attractively. Also time, season, or the like may be used for the determination of the basic image by acquiring the time and/or date when a conversation is started from a clock provided in the information processing device 10*a*.

FIG. 7 shows an example of a data structure for a facial expression criterion stored in the facial expression criterion storage 75. The facial expression criterion 120 is information that associates a facial expression type 122, an amount of interest 124, a lower limit criteria value 126 and an upper limit criteria value 128 among each other. The facial expression type 122 is a type of facial expression (e.g., "mouth opening," "eye closing," "smile," or the like), whose degree should be converted to a numerical value as the facial expression parameter. As described above, the facial expression parameter affects the weights used when synthesizing a plurality of three-dimensional models, the weights determining the facial expression of a character. Therefore, a type that is preferably included in the facial expressions of a character is selected in advance. In addition, three-dimensional models corresponding to respective types are provided.

The amount of interest 124 is a parameter that is focused when determining the degree of each facial expression. The amount of interest 124 is, for example, the coordinates of the feature points, the distribution of the feature points, the distance among the plurality of feature points, the distance from an initial position, or the like, which can be derived from the coordinates of respective feature points extracted by the face recognition unit 64. The lower limit criteria value 126 and the upper limit criteria value 128 are concrete values of the amount of interest in case of determining that each facial expression is not made at all, and in case of determining that the facial expression is maximally made, respectively. For example, in case of determining the degree of facial expression "mouth opening," if "the distance between the upper and lower lips" is "Δy1," the mouth is determined to be closed, and if the distance is "Δy2," the mouth is determined to be maximally opened.

In case of "eye closing," if "the distance between upper and lower eyelids" is "Δy3," the eye is determined to be opened, and if the distance is "Δy4," the eye is determined to be closed. Regarding eyes, the degree of closing of the right eye and the degree of closing of the left eye are determined separately. Further, while utilizing a general tendency that the inner corner of the eye rises and the outer corner of the eye falls when laughing, in case of determining the degree of "smile," the amount of interest is defined as the amount of change of the height difference between the inner corner of the eye and the outer corner of the eye from an initial value. In this process, if the parameter is "0," the facial expression is determined to be not laughing at all, and if the parameter "Δy5," the facial expression is determined to be laughing maximally.

Although only a simple representation is shown in FIG. 7, the amount of interest 124, the lower limit criteria value 126 and the upper limit criteria value 128 may be determined in more detail in practice. For example, "the distance between the upper and lower lips" is actually the distance between y coordinates indicating positions in the vertical direction of the feature points at the center of the upper lip and the lower lip respectively, etc. As "Δy1" and "Δy2," specific values are defined in advance based on the average face, or the like. A plurality of conditions may be defined for one facial expression.

Further, criteria shown in FIG. 7 are merely examples, thus the conditions may be defined using various methods available for facial expression recognition, such as pattern matching, frequency analysis of an images, shape variation when meshing the face, or the like. In any case, the condition when each facial expression is not made at all and the condition when the facial expression is maximally made are defined as the facial expression criterion in advance. By normalizing the actual amount of interest by setting 0 as the lower limit criteria value and 1 as the upper limit criteria value, the facial expression parameter generating unit 66 converts the degree of each facial expression to a numerical value. For example, if the distance between the upper and lower lips is intermediate between Δy1 and Δy2, the "mouth opening" parameter is "0.5."

FIG. 8 schematically shows the way a model control unit 68 synthesizes the model of a character according to the embodiment. In this example, a model of a cow is defined as the character. Stored in the image data storage 76 as the three-dimensional model of the character of the cow is data on a plurality of facial expression models, such as a basic model 130, a model closing the right eye 132, a model closing the left eye 134, a model uttering the vowel "a" 136, a model uttering the vowel "i" 138, model uttering the vowel "u" (not shown), a smiling model (not shown), or the like.

By synthesizing all facial expression models after weighing by weights w0, w1, w2, w3, . . . , determined for each facial expression model based on the facial expression parameter derived by the facial expression parameter generating unit 66, the ultimate output model 140 is generated. The facial expression models are synthesized, for example, by using geometry data of respective models and by executing vertex blending by a vertex shader included in the GPU 34 in a manner described below.

$$o' = o + (p0-o) \times w0 + (p1-o) \times w1 + (p2-o) \times w2 + (p3-o) \times w3 + (p4-o) \times w4 + (p5-o) \times w5 \quad \text{(expression 1)}$$

In the above expression, o' is the vertex coordinates of the synthesized model, o is the vertex coordinates of the basic model 130, p0, p1, p2, p3, p4, and p5 are the vertex coordinates of the model closing the right eye 132, the vertex coordinates of the model closing the left eye 134, the vertex coordinates of the model uttering the vowel "a" 136, the vertex coordinates of the model uttering the vowel "i" 138, the vertex coordinates of the model uttering the vowel "u," and the vertex coordinates of the smiling model, respectively.

Further, w0, w1, w2, w3, w4, and w5 are the weight parameter for the model closing the right eye 132, the weight parameter for the model closing the left eye 134, the weight parameter for the model uttering the vowel "a" 136, the weight parameter for the model uttering the vowel "i" 138, the weight parameter for the model uttering the vowel "u," and the weight parameter for the smiling model, respectively, which are values more than or equal to 0 and less than or equal to 1.

As the weight parameter w0 for the model closing the right eye 132, the degree of closing the right eye obtained for the "eye closing" included in the facial expression parameters is directly used. In a similar manner, as the weight parameter w1 for the model closing the left eye 134, the degree of closing the left eye obtained for the "eye closing" is directly used, and as the weight parameter w5 for the smiling model, the degree of smiling obtained for the "smiling" is directly used. Whereby a status can be generated in which, for example when a user closes the right eye, the output model also closes its right eye, and when a user smiles, the output model also smiles.

Meanwhile, as mentioned above, the values of the weight parameter w2 for the model uttering the vowel "a" 136, the weight parameter w3 for the model uttering the vowel "i" 138, and the weight parameter w4 for the model uttering the vowel "u" are determined so as to vary with time in the period of pronouncing. For example, as indicated below, w2, w3, and w4 are determined to be the absolute value of sine waves having different time cycles.

$$w2=|V\sin(0.7500f)|+m$$

$$w3=|2V\sin(0.3750f)|$$

$$w4=|2V\sin(0.1875f)| \quad \text{(expression 2)}$$

However, if w2 is more than 1.0, w2 is set so that w2=1.0. In this expression, V is a normalized value of the voice volume of the user 12a with reference to a predetermined sound volume. V is calculated from voice data acquired from the microphone 16a. "f" is the number of input image frame currently being the target of recognition. "f" is a value given to each image frame included in a sequence of image frames along the time axis in the order ascending from 0. That is, as "f" proceeds 0, 1, 2, . . . , the time elapses. "m" is the degree of opening the mouth obtained for the "mouth opening" included in the facial expression parameters calculated by the facial expression parameter generating unit 66.

According to the above expression, if V is 0, w2, w3, and w4 are set so that w2=m, w3=w4=0. That is, when the voice volume V is 0, the user 12a does not speak and thus there is no need to show the character as if speaking. However, if the mouth is open even if only slightly, that is reflected to the facial expression of the character. Therefore, the degree m thereof is set as the weight w2 for the model uttering the vowel "a" 136.

If the voice volume V is more than 0, parameters w2, w3, and w4 vary as the absolute values of sine waves having different time cycles with the elapse of time accompanying the progression of an input image frame being the target of recognition. The amplitudes of sine waves change in accordance with the voice volume V. Whereby, the higher the voice volume V is, the larger, the mouth is opened as a whole. Further, in the above expression, time cycles of sine waves of w2, w3, and w4 are differently defined, i.e., one time, two times, and four times, by which diverse and subtle movements of a mouth is represented. Parameters w3 and w4 are further multiplied by the factor "2". Such factor and/or the way to differentiate the time cycles may be determined by adjusting so that the character looks more natural while checking the movement of the mouth of synthesized model.

To the weight w2 for the model uttering the vowel "a" 136, the degree of opening of a mouth m is added even when the voice volume is not 0. Whereby, the louder the voice is, and the larger the mouth is opened, the stronger the facial expression uttering "a" is reflected to the synthesized model, and thus the status in which the mouth is opened is maintained even when the absolute value of the sine wave is close to 0. In this way, the weight for a plurality of face models having the shapes of mouth when pronouncing typical sounds, such as "a,""i,""u," or the like is changed with time with different wave forms, while considering the volume level and the degree of opening of a mouth at the same time. Whereby, complicated movements of the lips of mouth can be represented, and concurrently, rough movements can be presented so that the movements agree with the voice.

Since the face when pronouncing "e" resembles to the face when pronouncing "i," and the face when pronouncing "o" resembles to the face when pronouncing "u." Therefore, even only using three models of "a,""i," and "u," by synthesizing the models as described above, various shapes of the mouth when a person speaks can be covered. As a result, the realistic movements of a face can be represented with small data size and with an easy calculation.

Figure 9:
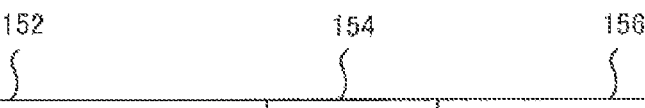
FIG. 9 shows an example of a data structure for a command ID table according to the embodiment.

FIG. 9 shows an example of a data structure for a command ID table stored in the command information storage 78. The command ID table 150 includes a pattern field 152, a command ID field 154, and a command field 156. As described above, the command specifying unit 72 monitors the time variation of the feature point of respective parts of the face by utilizing the processing result of the face recognition of the user 12a performed by the face recognition unit 64 throughout conversations, and determines whether or not the change that falls into a pattern defined in the pattern field 152 occurs.

As described above, the pattern defined in the pattern field 152 may be a natural facial expression or may be a facial expression, which does not occur unless the user makes the expression consciously. For the latter pattern, a user have to make the expression pattern while recognizing the pattern, thus the defined patterns and the changes caused by the respective patterns are presented to the user in advance. Alternatively, the user himself/herself can define a pattern and the change caused by the pattern.

In the command ID field 154 and the command field 156, the command ID of a command to be executed, and the name of command, the name of execution file, the name of function, or the like, which are entities for executing the command, are recorded respectively while being associated with the pattern defined in the pattern field 152. In practice, the pattern defined in the pattern field 152 may be further associated with data describing a specific change of feature point, and the command specifying unit 72 may refer to the description.

Further, a parameter other than the feature point, which is used in general facial expression recognition processing may be used in the determination. The data recorded in the command field 156 is not limited as far as the data is configured so that the command executing unit 84 of the received data processing unit 80 can execute a command based on a command ID transmitted from the information processing device 10b of the other user. In the example shown in FIG. 9, besides patterns already described, such as, "keep laughing more than or equal to 5 seconds," and "after the left eye is closed, the mouth is opened and the right eye is closed," patterns such as "nodding of the head," "shaking of the head," "five winks," and "inclining of the head" are defined.

If a user "nods his/her head," that is deemed as the indication of intention of "approval," a process for representing the intention is performed on a display image. For example, an appearance in which the character of a user who generates such a pattern thumbs up or claps hands is represented. Other than those above, various processes are possible, such as, changing the color of a background image or the face of a character, bestrewing heart figures all over the screen image, etc. In any case, on detecting that the user 12a who operates the information processing device 10a "nods his/her head,"the information processing device 10a specifies a command referred to as "022" from the command ID field 154 and transmits the ID to the information processing device 10b of the other user. Alternatively, the corresponding moving image parameter or the data of the corresponding animated moving image is transmitted.

The information processing device 10b receives the command ID, and based thereon, specifies a command execution file referred to as "approval" from the command field 156. By executing the command execution file, the information processing device 10b processes the image in which the character of the user at the source of transmission is displayed. In a similar manner, in case that a user "shakes his/her head," that is deemed as the indication of intention of "denial,"representation contrastive to that of the "approval" is provided. In this manner, if a scene occurs that an appointment (e.g., an offer of an outing) is to be made during a conversation, the indication of intention of "approval" or "disapproval" can be made casually. In this process, by expressing the intention with a representation exaggerated to a certain extent on an image, an entertainment experience that is difficult to attain with only an actual voice and an actual image can be provided.

If "five winks" occurs, i.e., motions of closing one eye is performed five times consecutively in a predetermined time range, that is deemed as the indication of intention of inviting to something, and "invitation animation," which has been prepared beforehand, is played back and displayed. For example, in a mode where the user's own character and the other user's character are displayed on the same screen as shown in FIG. 4, animation in which an invitation letter is sent from the character of the inviting user to the character of the invited user.

If "inclining the head" occurs, i.e., a motion of inclining the head by more than or equal to a predetermined angle is made, that is deemed as the indication of intention of having an interrogation, and a text file or a homepage describing the way how to use the information processing device 10a or the like, is displayed in another window. For example, displaying a table, such as the command ID table 150 allows a user to know according to which motion the user should move. This window is required to be displayed only on the display of the information processing device 10a operated by the user who has moved according to such a motion. Therefore, it is not required to transmit the command ID to the information processing device 10b of the other user.

According to the embodiment described above, in a conversation system with which a plurality of users converse with each other via a network, a character determined for each user is displayed instead of the real image of the other user, and is moved in real time in accordance with the real voice. In this process, by preparing a plurality of three-dimensional models of different facial expressions for one character and by synthesizing the models while weighing with the weights that reflects an actual facial expression of the user, the facial expression of the character becomes similar to the actual facial expression. More specifically, the degrees of respective facial expressions are converted to numerical values at each instant of time by using a facial recognition technique, and based on the values, the weights are changed.

In this process, by preparing three-dimensional models of a face pronouncing typical sounds, such as "a,""i,""u," or the like, and by synthesizing the three-dimensional models while weighing with the weights with the amplitudes corresponding to the voice volume and changing independently with time, complicated and subtle movements of the lips of mouth can be represented with simple calculations. Since various movements of mouth when a person speaks are virtually generated by using only the models of "a,""i,""u," only a small quantity of data for necessary models are required, and the calculations are easy.

Further, for the weight for a face pronouncing the vowel "a,"by taking into account the actual degree of opening of a mouth, natural movements of mouth that agree with actual voices can be presented in both fine movements and rough movements with reality. By synthesizing a plurality of models, the facial expressions of a character are diversified and can be changed with time in accordance with the voices and the facial expressions of a user, which can show the character as if the character actually speaks, with low processing cost.

Further, the costumes or the backgrounds of a character are determined in accordance with the status where the user is put (e.g., a game that has been played by the user, the whereabouts of the user, or the like), which can enhance the entertainment experience. Further, by monitoring the change in the facial expression of the user, a command is generated from the pattern of the facial expression made in a limited range of time. In this manner, the input manipulation using a hand, such as the manipulation of a controller, etc, is not required, thus the operation can be simplified. By processing an image during conversations triggered by operations using facial expressions, the indication of intention or the like can be presented effectively, which can warm up the conversation.

As to a command to be generated, only the identification information thereof is sent to the information processing device of the other user, and the actual execution of the command is performed by the information processing device of the other user. Further, only a moving image parameter for displaying the animated character is sent to the information processing device of the other user, and the generation of moving image is performed by the information processing device of the other user. In this manner, the processing cost is disconcentrated, and at the same time, stress on the communication band is reduced. In this manner, even if the processing resources and/or the communication band are limited, an image of a character that moves in a complicated manner in real-time can be displayed, and a natural conversation system that rarely produces a disagreement with voices can be implemented.

Given above is an explanation based on the exemplary embodiments. These embodiments are intended to be illustrative only and it will be obvious to those skilled in the art that various modifications to constituting elements and processes could be developed and that such modifications are also within the scope of the present invention.

For example, although a mode wherein the costume originated from the game that the user played right before is put on the character is represented according to the embodiment, all the models of the character including its face may be replaced with a character of the game. Also in this case, by replacing the costume field 110 of the basic image ID table 100b shown in FIG. 6 with the character field, and by defining information identifying the model of the character, processing procedures can be implemented in a similar manner with that of the embodiment.

What is claimed is:

1. An information processing device comprising a computer processor operating under the control of one or more software programs such that the computer processor implements functions and actions, including:

an image data storage operative to store data on models of a character representing a user, the models including a plurality of facial expression models providing different facial expressions, and the plurality of facial expression models including a plurality of vocal models indicating statuses of a face when pronouncing different sounds;

a facial expression parameter generating unit operative to calculate a degree of facial expression for each facial expression as a respective facial expression parameter by sequentially analyzing input moving image data acquired by capturing an image of the user, by deriving a numerical value representing a shape of a portion of a face for each of a plurality of input image frames, and by comparing the numerical value with a criteria value defined in advance;

a model control unit operative to determine a weight for each of the plurality of facial expression models stored in the image data storage by using the facial expression parameter calculated by the facial expression parameter generating unit and a volume level obtained from voice data of the user acquired along with the capturing of the image, to synthesize the plurality of facial expression models according to the weights, to determine an output model of the character for points of time corresponding to each of the input image frames, and to synthesize the plurality of vocal models while changing the weights for the plurality of vocal models with different waveforms with time, wherein at least one of the facial expression parameters includes a degree of opening of a mouth and the model control unit is further operable to add the degree of opening of the mouth to at least one of the weights for the vocal models;

a moving image parameter generating unit operative to generate a moving image parameter for generating animated moving image frames of the character including the output model determined by the model control unit for respective points of time; and an output unit operative to synchronize the moving image parameter generated by the moving image parameter generating unit and the voice data and to sequentially output.

2. The information processing device according to claim 1, wherein the different waveforms have amplitudes in proportion to the volume level and are absolute values of sine waves having different time cycles.

3. The information processing device according to claim 1, wherein the vocal models include a vocal model representing a status of a face when pronouncing the vowel "a," a vocal model representing a status of a face when pronouncing the vowel "i," and a vocal model representing a status of a face when pronouncing the vowel "u."

4. The information processing device according to claim 1, wherein the output unit sequentially transmits the moving image parameter to another information processing device via a network.

5. The information processing device according to claim 1, wherein the computer processor implements further functions and actions, including:

a command specifying unit operative to specify, based on a time variation of facial expressions that the facial expression parameter generating unit acquires by analyzing the input moving image data, identification information of a command for changing an image in accordance with the time variation, wherein the output unit further outputs the identification information of the command specified by the command specifying unit so as to change the animated moving image frames of the character.

6. The information processing device according to claim 5, wherein the output unit transmits the moving image parameter and the identification information of the command to another information processing device connected to the present information processing device via a network, and displays side by side on a display device: a) the animated moving image frames of the character representing the user who is operating the present information processing device, the animated moving image frames being generated based on the moving image parameter; and b) the animated moving image frames of the character representing another user who is operating the other information processing device, the image being generated based on the moving image parameter transmitted from the other information processing device, and the animated moving image frames of the characters of both users are changed based on the identification information of the command, on condition that the identification information of the command transmitted to the other information processing device and the identification information of the command transmitted from the other information processing device are the same.

7. The information processing device according to claim 5, wherein the output unit transmits the moving image parameter and the identification information of the command to another information processing device connected to the present information processing device via a network, and displays side by side on a display device: a) the animated moving image frames representing the character of the user who is operating the present information processing device, the image being generated based on the moving image parameter; and b) the animated moving image frames of the character representing another user who is operating the other information processing device, the image being generated based on the moving image parameter transmitted from the other information processing device, and the animated moving image frames of the characters of both users are changed based on either one of the identification information of the command transmitted to the other information processing device or the identification information of the command transmitted from the other information processing device.

8. The information processing device according to claim 1, wherein the model control unit determines the output model so as to set a costume of the character as the costume of a character of a game that the user played right before by using the information processing device, the costume of the character of the game being associated with the game in advance.

9. The information processing device according to claim 1, wherein the model control unit defines a surrounding image captured simultaneously with the capturing of the image of the user as the background image of the character of the user.

10. An information processing method comprising:

calculating a degree of facial expression for each of a plurality of facial expressions as a respective facial expression parameter by sequentially analyzing input moving image data acquired by capturing an image of a user, by deriving a numerical value representing a shape of a portion of a face for each of a plurality of input image frames, and by comparing the numerical value with a criteria value defined in advance;

determining a weight for each of a plurality of models of a character representing the user, the models including a plurality of facial expression models providing different facial expressions stored in a memory, and the plurality of facial expression models including a plurality of vocal models indicating statuses of the face when pronouncing different sounds, by using the calculated facial expression parameter and a volume level obtained from voice data of the user acquired along with the capturing of the image;

reading data of the plurality of facial expression models from the memory;

synthesizing the plurality of facial expression models while weighing with the weights, and determining an output model of the character for points of time corresponding to each of the plurality of input image frames;

synthesizing the plurality of vocal models while changing the weights for the plurality of vocal models with different waveforms with time, wherein at least one of the facial expression parameters includes a degree of opening of a mouth;

adding the degree of opening of the mouth to at least one of the weights for the vocal models;

generating a moving image parameter for generating animated moving image frames of the character including the output model for respective points of time; and synchronizing the moving image parameter and the voice data, and outputting sequentially.

11. A computer program embedded on a non-transitory computer-readable recording medium, comprising:

a module configured to calculate a degree of facial expression for each of a plurality of facial expressions as a respective facial expression parameter by sequentially analyzing input moving image data acquired by capturing an image of a user, by deriving a numerical value representing a shape of a portion of a face for each of a plurality of input image frames, and by comparing the numerical value with a criteria value defined in advance;

a module configured to determine a weight for a plurality of models of a character representing the user, the models including a plurality of facial expression models providing different facial expressions stored in a memory, and the plurality of facial expression models including a plurality of vocal models indicating statuses of the face when pronouncing different sounds, by using the calculated facial expression parameter and a volume level obtained from voice data of the user acquired along with the capturing of the image;

a module configured to read data of the plurality of facial expression models from the memory;

a module configured to synthesize the plurality of facial expression models while weighing with the weights, and to determine an output model of the character for points of time corresponding to each of the plurality of input image frames;

a further module configured to synthesize the plurality of vocal models while changing the weights for the plurality of vocal models with different waveforms with time, wherein at least one of the facial expression parameters includes a degree of opening of a mouth;

a module configured to add the degree of opening of the mouth to at least one of the weights for the vocal models;

a module configured to generate a moving image parameter for generating animated moving image frames of the character including the output model for respective points of time; and a module configured to synchronize the moving image parameter and the voice data, and to output sequentially.

12. A non-transitory, computer readable recording medium encoded with a program comprising:

a module configured to calculate a degree of facial expression for each of a plurality of facial expressions as a respective facial expression parameter by sequentially analyzing input moving image data acquired by capturing an image of a user, by deriving a numerical value representing a shape of a portion of a face for each of a plurality of input image frames, and by comparing the numerical value with a criteria value defined in advance;

a module configured to determine a weight for a plurality of models of a character representing the user, the models including a plurality of facial expression models providing different facial expressions stored in a memory, and the plurality of facial expression models including a plurality of vocal models indicating statuses of the face when pronouncing different sounds, by using the calculated facial expression parameter and a volume level obtained from voice data of the user acquired along with the capturing of the image;

a module configured to read data of the plurality of facial expression models from the memory;

a module configured to synthesize the plurality of facial expression models while weighing with the weights, and to determine an output model of the character for points of time corresponding to each of the plurality of input image frames;

a further module configured to synthesize the plurality of vocal models while changing the weights for the plurality of vocal models with different waveforms with time, wherein at least one of the facial expression parameters includes a degree of opening of a mouth;

a module configured to add the degree of opening of the mouth to at least one of the weights for the vocal models;

a module configured to generate a moving image parameter for generating animated moving image frames of the character including the output model for respective points of time; and a module configured to synchronize the moving image parameter and the voice data, and to output sequentially.

* * * * *